United States Patent [19]

Kitagishi

[11] Patent Number: 5,089,835
[45] Date of Patent: Feb. 18, 1992

[54] PHASE-TYPE DIFFUSING PLATE

[75] Inventor: Nozomu Kitagishi, Tokyo, Japan

[73] Assignee: Canon Kabushiki Kaisha, Tokyo, Japan

[21] Appl. No.: 482,812

[22] Filed: Feb. 21, 1990

[30] Foreign Application Priority Data

Feb. 28, 1989 [JP] Japan .................................. 1-47966
Jun. 28, 1989 [JP] Japan ................................. 1-167901

[51] Int. Cl.$^5$ .............................................. G03B 3/00
[52] U.S. Cl. ..................................... 354/200; 359/569
[58] Field of Search ............................... 354/200, 201; 350/162.11, 162.12, 162.2, 162.23, 162.24, 169

[56] References Cited

U.S. PATENT DOCUMENTS

| 4,338,012 | 7/1982 | Matsumura et al. ............... 354/200 |
| 4,547,663 | 10/1985 | Kitagishi et al. ............... 250/201.2 |
| 4,586,786 | 5/1986 | Suzuki et al. ..................... 350/169 |
| 4,598,977 | 7/1986 | Kobayashi ........................ 350/162.2 |
| 4,679,901 | 7/1987 | Dammann et al. ............... 350/162.2 |

FOREIGN PATENT DOCUMENTS 55-009568 1/1980 Japan .
55-070827 5/1980 Japan .

Primary Examiner—L. T. Hix
Assistant Examiner—Howard B. Blankenship
Attorney, Agent, or Firm—Fitzpatrick, Cella, Harper & Scinto

[57] ABSTRACT

A focusing screen suited to be used in the camera, having three plane portions of different heights in each of small areas, wherein the plane portion A, the plane portion B and the plane portion C are arranged in the order from the lowest height, and letting the height of the plane portion B measured from the plane portion A be denoted by $d_B$, the height of the plane portion C from the plane portion A by $d_C$, and the area ratios of the plane portions A, B and C to the entire area by $S_A$, $S_B$ and $S_C$ (where $S_A + S_B + S_C = 1$) respectively, the following conditions are satisfied $$1.6 < d_C/d_B < 2.5$$

$$0.35 < S_B < 0.5$$

whereby the color tint is minimized for good optical performance.

16 Claims, 13 Drawing Sheets

PHASE-TYPE DIFFUSING PLATE

BACKGROUND OF THE INVENTION

1. Field of the Invention

This invention relates to phase-type diffusing plates and, more particularly, to phase-type diffusing plates which, when used as, for example, the focusing screen for forming a finder image in the photographic camera or the like, have a predetermined diffusing characteristic that enables an excellent finder image to be observed.

2. Description of the Related Art

The conventional method of producing a certain diffusing characteristic is attained by forming a great number of minute patterns of predetermined shape in a profile of constant height on the surface of an optically transparent substrate so that the light wave emerging from the region of the minute pattern has a different phase from that of the wave emerging from the other region. Phase-type diffusing plates of the so-called bi-level form are proposed in, for example, Japanese Laid-Open patent application No. Sho 55-70827.

FIG. 10 shows a schematic fragmentary perspective view of the bi-level form of the phase-type diffusing plate in the specification of the above-identified publication. In the same figure, reference numeral 101 denotes a substrate. Minute patterns 102 of constant height are formed on the surface of the substrate 102. And, one of two parts of light which passes through a region A of the upper surface of the substrate 101 and the other which passes through regions B of the patterns 102 are given a phase difference from each other. Thus, a certain diffusing characteristic is obtained.

The light entering through the phase-type diffusing plate is diffracted to ±1st, ±2nd, ... order maximums on either side of the 0th order or central maximum as shown in FIG. 11.

In principle, the diffracted ray "u" of a direction ($\theta x$, $\theta y$) of the phase-type diffusing plate is found as follows. Letting the wavelength be denoted by $\lambda$, and the angles of incidence by $\theta x$ and $\theta y$, putting $Nx = (\sin \theta x)/\lambda$ and $Ny = (\sin \theta y)/\lambda$ and defining the phase distribution at a point (x, y) on the diffusing plate by $\phi(x, y)$, the Fourier transformation of the phase distribution gives the following equation:

$$u(Nx, Ny) \sim \int\int exp(-i\phi(x,y)) \cdot exp(-i2\pi(N_x x + N_y y)) dx dy$$

Now assuming that a plane portion A of the upper surface of the diffusing plate is taken as the reference plane, and another plane portion (also called "phase" portion) B has a height $d_B$, and letting the refractive index of the phase portion B be denoted by n, then the phases of these plane portions are expressed by $$\phi(x,y)_A = 0$$

$$\phi(x,y)_B = 2\phi(n-1) \cdot d_B/\lambda$$

Letting the area ratios of the plane portions A and B to the entirety be denoted by $S_A$ and $S_B$ respectively, the intensity $I_0$ of the 0th order diffracted light (straight going component) at the wavelength $\lambda$ can be expressed in the following form:

$$I_0 = 1 - 2S_A \cdot S_B \cdot (1 - (\cos(2\phi(n-1) \cdot d_B/\lambda)))$$

where $S_A + S_B = 1$

For example, quartz glass (nd = 1.45867, $\nu$d = 67.9) is used in the substrate, and a great number of minute phase portions of height $d_B = 0.61$ $\mu$m are formed on the substrate with the area ratio of the phase portions being $S_A = S_B = 0.5$. With this diffusing plate, the spectral characteristic of the 0th order diffracted light becomes like that shown in FIG. 12.

In the case of the bi-level phase-type diffusing plate, it is in this condition that the intensity of the white 0th order diffracted light can decrease to the minimum. The intensity of the white 0th order diffracted light weighted with the spectral characteristic of a light source $D_{65}$ and the relative luminous efficiency takes a value of 1.61% when the incident light intensity is 100%.

This example of 0th order diffracted light is tinted with blue as is understandable from the chromaticity diagram of FIG. 14. On variation of the height of the phase portions, the tint varies as depicted in the trace as shown in FIG. 14. In so low a height range d = 0.5 to 0.7 $\mu$m that the intensity of the white 0th order diffracted light has no practical problem, a tint of any color from orange to blue arises unavoidably.

The presence of such a color tint in the 0th order diffracted light makes, for example, the finder image very unpleasant to observe.

In more detail, for the interchangeable lens type of a single-lens reflex camera, its finder system is designed with a condenser lens or Fresnel lens whose power is so determined that the pupils of the photographic lens and the eyepiece lens coincide with each other at the standard focal length. With such a camera, when combined with the standard lens and when the diaphragm is stopped down to small sizes of aperture opening, say F/11 or F/16 or smaller, the entire area of the finder image frame is tinted with the same color as that of the 0th diffracted light.

Further, when the standard lens is interchanged with a lens system of different exit pupil distance such as a telephoto lens or a close-up lens, and when the diaphragm is stopped down, a clear spot of the same color as that of the 0th order diffracted light appears at the center of the area of the finder image frame as shown in FIG. 15.

This phenomenon is moderated as the size of the diaphragm aperture increases. But, the telephoto lens, or close-up lens, because of being dark in F-number at full open aperture, allows it to survive in many events. Moreover, the marginal zone of the finder image frame has its diffusing light which shows the spectral characteristic of a color in complementary relation to the color of the 0th order diffracted light, which is exemplified in FIG. 13 and, therefore, is tinted with the complementary color to the color of the central zone of the finder image frame. Hence, color blurs in the finder image appear as shown in FIG. 16.

To eliminate this problem, the method disclosed in, for example, Japanese Laid-Open patent application No. Sho 55-9568 may be adopted to make the area ratio $S_A$ or $S_B$ of the phase portion deviate from 0.5 to some extent so that such a color tint just disappears. But the intensity of the 0th order diffracted light increases, thereby giving rise to an alternative problem of breaking the uniformity of the luminance over the entire area of the finder image frame.

As related art, there is U.S. patent application Ser. No. 359,487 filed on May 31, 1989.

SUMMARY OF THE INVENTION

An object of the invention is to set forth proper rules of design for the number of kinds, the area ratio, and the heights of a plurality of minute plane portions (patterns) of predetermined shape formed on the upper surface of a substrate to thereby achieve a great reduction of the intensity (white color) and color tint of the 0th order diffracted light and, to eliminate further the color tint of the diffused light. Another object of the present invention is to provide a phase-type diffusing plate which, when applied to, for example, the finder system, of a camera enables an excellent finder image to be observed.

The invention has a feature wherein a plurality of minute plane portions including a reference plane and comprised of three kinds of heights are provided on the surface of a substrate. Other features of the present invention are conditions under which the aforesaid plane portions are utilized in obtaining a desired diffusion characteristic by diffracting and/or scattering the entering light with predetermined phase differences. Labeling the aforesaid plane portions as A, B and C in the order from the lowest height as a surface of the substrate which has the plane portions turns upward, and letting the height of the plane portion B from the plane portion A serving as the reference be denoted by $d_B$, the height of the plane portion C by $d_C$, and the area ratios of the plane portions A, B and C to the entirety by $S_A$, $S_B$ and $S_C$ (where $S_A + S_B + S_C = 1$) respectively, the conditions are given by the following expressions:

$$1.6 < d_C/d_B < 2.5 \tag{1}$$

$$0.35 < S_B < 0.5 \tag{2}$$

DETAILED DESCRIPTION OF THE PREFERRED EMBODIMENTS

Figure 23:
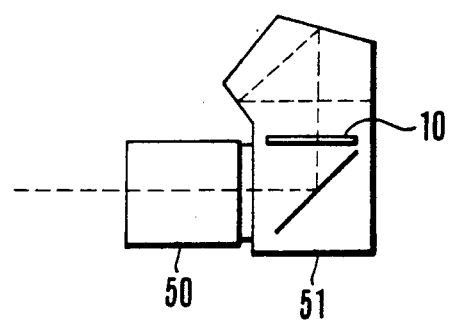
FIG. 23 is a side sectional view of a single-lens reflex camera employing a focusing screen relevant to the invention.

FIG. 23 shows the layout of the diffusing plate relevant to the invention, where reference numeral 50 denotes a photographic lens, and reference numeral 10 denotes the focusing screen relevant to the invention arranged in a conjugate position to the film plane.

Figure 1:
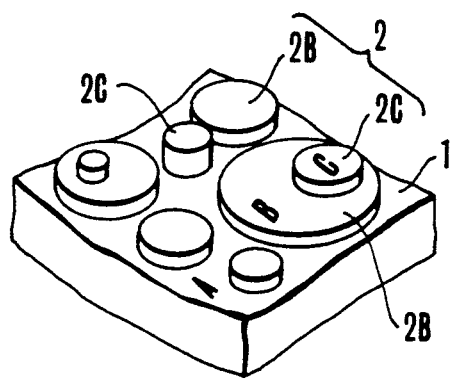
FIG. 1 is a fragmentary perspective view of a first embodiment of a phase-type diffusing plate of 3-level form according to the invention.
Figure 2:
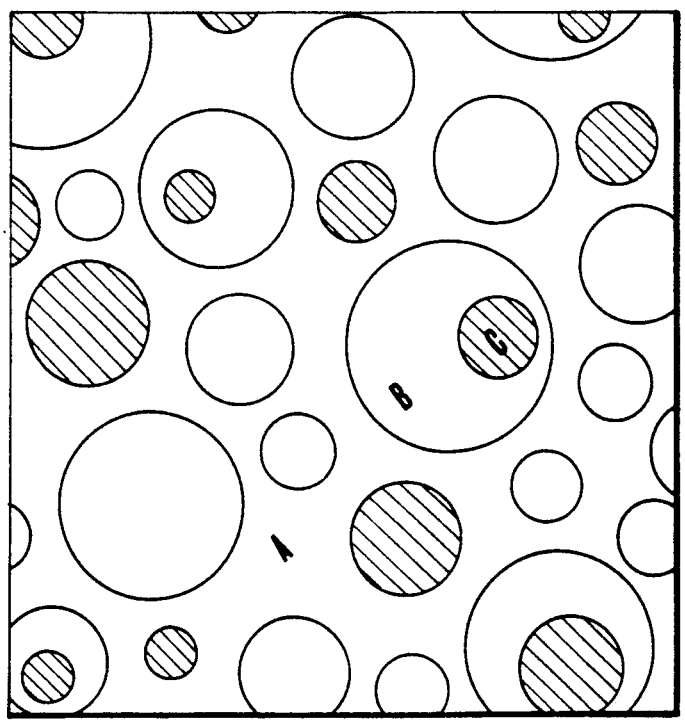
FIG. 2 is a top view of the diffusing plate of FIG. 1.

FIG. 1 in perspective view shows the essence of a first embodiment of the diffusing plate according to the invention. FIG. 2 is the top view of the first embodiment of the invention.

In these figures, a substrate 1 has minute round patterns 2 formed on the upper surface thereof to thereby give three plane portions (also called "phase" portions) A, B and C as an integral structure. The plane portion A corresponds to the substrate 1. The other plane portions B and C have different heights from each other. Thus, the plane portions A, B and C constitute three different levels from one another.

By this structure the phase-type diffusing plate of the so-called 3-level form is made. In the same figures, the plane portion A is taken as the reference. In the order from the lower height, there are the plane portion B and the plane portion C. The material of the patterns 2B and 2C forming the plane portions B and C is the same as that of the substrate 1. But, as necessity arises, the pattern 2B or 2C may be made of a different material. Also, though the shapes of the patterns 2 are illustrated as round, it is to be understood that an ellipse, elongated round, polygon or any other shape may be used.

In the present embodiment, determination of the heights of the plane portions A, B and C and their area ratios to the entirety is made according to the above-described rules of design. So, the light beams pass through the respective regions of the plane portions A, B and C with predetermined phase differences from each other. This gives the plate a desired diffusing characteristic.

Next, the optical characteristics of the phase-type diffusing plate of the present embodiment are explained by using numerical formulae.

With respect to the light "u" diffracted by the 3-level phase-type diffusion plate in a ($\theta x$, $\theta y$) direction in the present embodiment, expressing the phase distribution at a point (x, y) on the diffusing plate by $\phi(x, y)$ and using the Fourier transformation of the phase distribution, the following formula is obtained:

$$u(N_x, N_y) \sim \int\int \exp(-i\phi(x,y)) \cdot \exp(-i2\pi(N_x \cdot x + N_y \cdot y)) dxdy$$

Taking the plane portion A on the diffusing plate as the reference plane, and letting the height of the plane portion B be denoted by $d_B$ and the height of the plane portion C by $d_C$, the phases of all the plane portions are expressed by:

$$\phi(x,y)_A = 0$$

$$\phi(x,y)_B = 2\pi(n-1) \cdot d_B/\lambda$$

$$\phi(x,y)_C = 2\pi(n-1) \cdot d_C/\lambda$$

Letting the area ratios of the plane portions A, B and C to the entirety be denoted by $S_A$, $S_B$ and $S_C$ respectively, the intensity $I_0$ of the 0th order diffracted light that is the straight going component is calculated by putting the following equation into the foregoing equations:

$$(\theta x, \theta y) = (0,0)$$

and using $$I_0 = u \cdot u^*$$
$$= (S_A + S_B \cdot e^{-i2\pi(n-1)d_B/\lambda} + S_C \cdot e^{-i2\pi(n-1)d_C/\lambda})$$
$$* (S_A + S_B \cdot e^{-i2\pi(n-1)d_B/\lambda} + S_C \cdot e^{-i2\pi(n-1)d_C/\lambda})$$

Rearranging the foregoing equations gives the following equation:

$$I_0 = 1 - 2S_A S_B \cdot (1 - \cos(2\pi(n-1) \cdot d_B/\lambda)) -$$
$$2S_A S_C \cdot (1 - \cos(2\pi(n-1) \cdot d_C/\lambda)) -$$
$$2S_B S_C \cdot (1 - \cos(2\pi(n-1) \cdot (d_C - d_B)/\lambda))$$

In this equation, the term

"$2S_A S_B \cdot (1 - \cos(2\pi(n-1) \cdot d_B/\lambda))$"

means that the light waves that have passed through the plane portions A and B come to interfere with each other, when sideward diffraction occurs to produce diffused light (diffracted light other than the 0th order one). The next two terms each mean likewise that the light waves from the plane portions A and C or from the plane portions B and C interfere with each other when sideward diffraction occurs to produce diffused light.

The total diffused light is the sum of these three terms. Therefore, the intensity of the 0th order diffracted light or the straight going component, has a value obtained by subtracting the total diffused light from the total light amount that is unity.

In such a manner, the total diffused light is determined by addition of the three terms for the diffused light owing to the superposition of the light waves having passed through the plane portions A and B, the plane portions A and C and the plane portions B and C. For this reason, in the present embodiment, the heights $d_B$ and $d_C$ of the plane portions B and C and the area ratios $S_A$, $S_B$ and $S_C$ are appropriately chosen to thereby cancel the color, thus making flat the spectral characteristic of all the diffused light, and also make flat the spectral characteristic of the intensity of the 0th order diffracted light.

In the present embodiment, evaluation of the intensity of the 0th order diffracted light of white color is performed with the weight of the relative luminous efficiency. Meanwhile, evaluation of color is performed with the $X_{10}$, $Y_{10}$, $Z_{10}$ expression system based on the 10 degree angular field in $x_{10}$, $y_{10}$ for the light source $D_{65}$.

From these, it has been found that when the phases (heights) and the area ratios of the plane portions fall within the ranges defined by the before-described inequalities of conditions (1) and (2), the intensity (white color) and the color tint of the 0th order diffracted light can be made minimum.

The condition (1) has an aim that the crest of the spectral characteristic of the diffused light of the plane portions A-B and the plane portions B-C and the valley of the spectral characteristic of the plane portions A-C are made to nearly coincide with each other to flatten the complete spectral characteristic.

The condition (2) has an aim that the intensity of the diffused light of the plane portions A-C is not too much strengthened and is a necessary condition also to flatten the complete spectral characteristic.

When the lower limits of the conditions (1) and (2) are exceeded, the intensity (white color) of the 0th order diffracted light becomes large and the diffraction image tends to be tinted with blue. When the upper limits of the conditions (1) and (2) are exceeded, the 0th order diffracted light tends to be tinted with yellow. So, it is no good.

In the present embodiment, concerning the area ratios $S_A$ and $S_C$ of the plane portions A and C, it is not better to exactly equalize both the ratios. To obtain a further improved diffusion characteristic, it is rather recommended to make either one of them somewhat larger than the other as follows:

$$0.46 < S_A/S_C < 0.95$$

$$1.05 < S_A/S_C < 2.2 \tag{3}$$

Also, of the area ratios $S_A$, $S_B$ and $S_C$, it is desirable to make the area ratio $S_B$ of the plane portion of the intermediate height larger than the other area ratios $S_A$ and $S_C$, because the color tint of the 0th order diffracted light can be further reduced.

The numerical data of specific examples of the invention are shown below.

Figure 3:
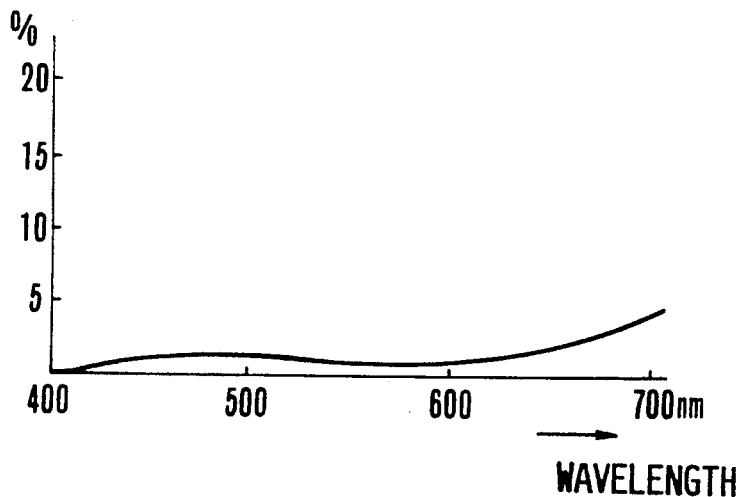
FIG. 3 is a graph of the spectral characteristics of the 0th order diffracted light of the first embodiment of the invention.
Figure 12:
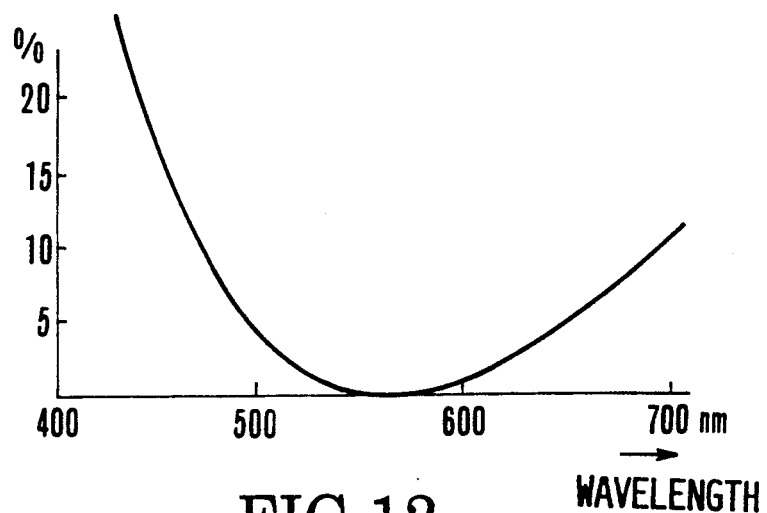
FIG. 12 is a graph of the spectral characteristics of the 0th order diffracted light of the conventional bi-level phase-type diffusing plate.

(Specific Example 1)
Substrate: Quartz Glass
($SiO_2$: $nd = 1.45867$, $vd = 67.9$)
Phase Distribution:

Level Differences $d_B = 0.498$ μm,
$d_C = 1.021$ μm
Area Ratios $S_A = 0.333$, $S_B = 0.442$, $S_C = 0.225$
$(nd - 1) \cdot d_B = 0.2284$, $(nd - 1) \cdot d_C = 0.4683$ This diffusing plate was tested by evaluating the intensity of the 0th order diffracted light of white color with the weight of the relative luminous efficiency and it has been found to be as small a value as 1.11%. And, the 0the order diffracted light shows such a spectral characteristic as shown in FIG. 3, which is considerably flat as compared with the so-called bi-level CAD mat of FIG. 12.

Figure 5:
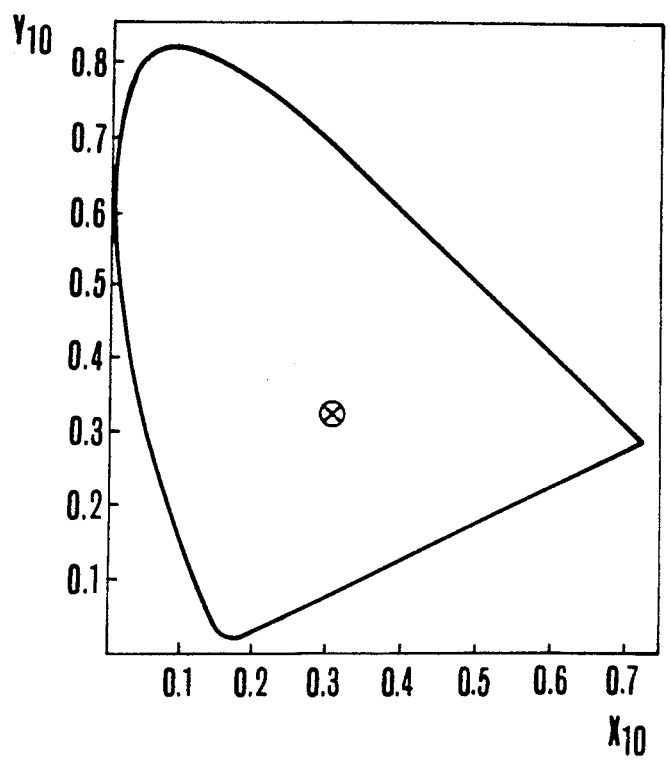
FIG. 5 is a chromaticity diagram of the 0th order diffracted light of the first embodiment.

Its color is, as shown in the chromaticity diagram of FIG. 5, almost white as it lies at a point $x_{10} = 0.3065$, $y_{10} = 0.333$. Therefore, when used in combination with the telephoto lens, the luminance unevenness and the color unevenness do not occur at small apertures. Also, with the standard lens, almost no color tint arises at small apertures.

Figure 4:
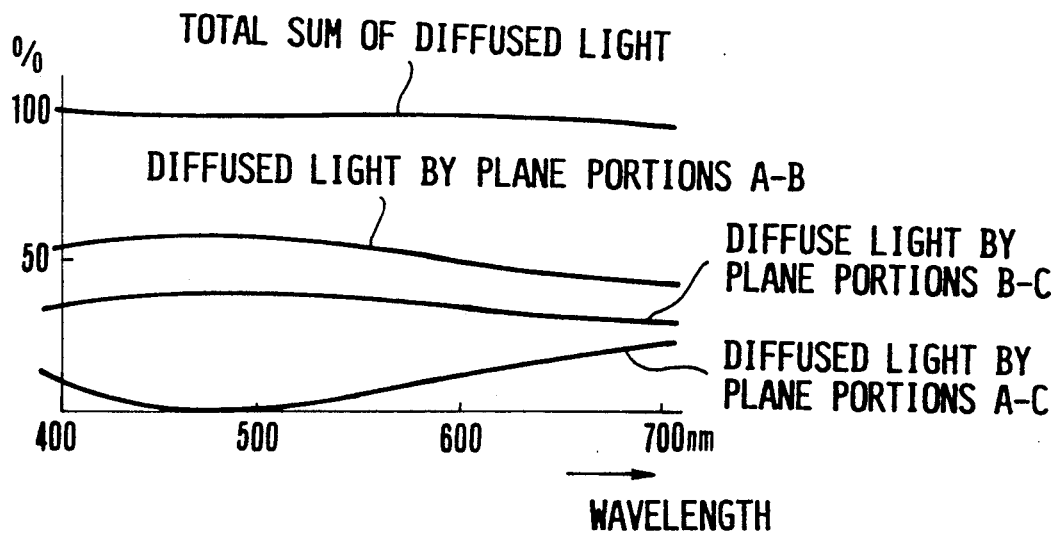
FIG. 4 is a graph of the spectral characteristics of the diffused light of the first embodiment.

Meanwhile, for specific example 1, the entire diffused light, the diffused light of the waves that have passed through the plane portions A and B, the plane portions A and C and, further, the plane portions B and C, (or the diffracted light other than the 0th order one) have spectral characteristics shown in FIG. 4. The sum of the crests of the spectral characteristics (A-B) and (B-C) and the valley of the spectral characteristic (A-C) almost coincide with each other and result in each other's complement. So, it is understandable why the curve of the spectral characteristic of the entire diffused light becomes flat.

Figure 13:
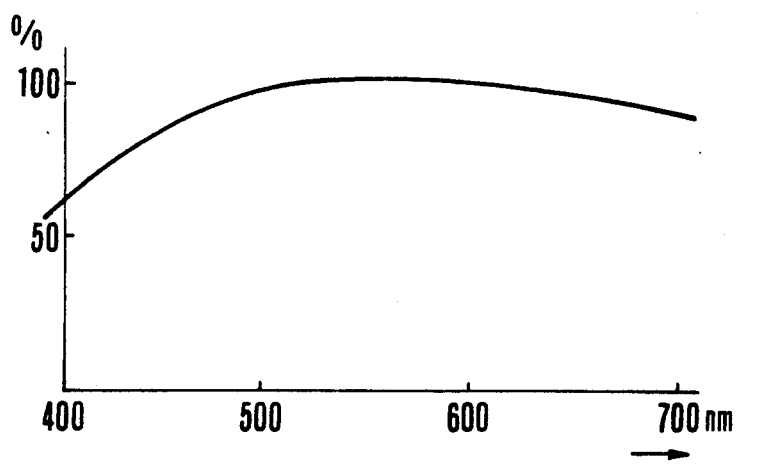
FIG. 13 is a graph of the spectral characteristics of the diffused light according to the prior art.
Figure 14:
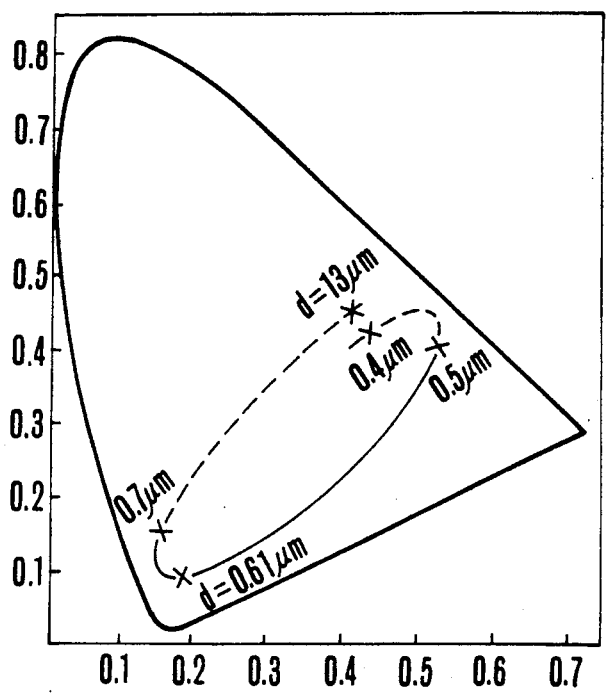
FIG. 14 is a chromaticity diagram of the 0th order diffracted light according to the prior art.
Figure 15:
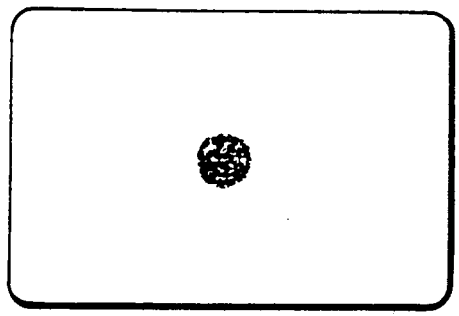
FIG. 15 and FIG. 16 are plan views illustrating the finder with a color tint when the telephoto lens is in use at a small aperture and at full open aperture respectively.
Figure 16:
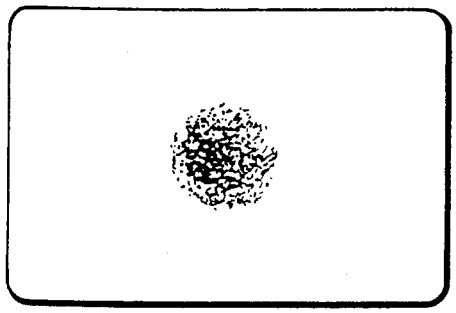

Concerning the entire diffused light, too, as is apparent from the comparison with the entire diffused light of the bi-level phase-type diffusing plate of FIG. 13, the flatness is considerably improved. Hence, its use in combination with the telephoto lens does not lead to a color unevenness at full open aperture.

Here, when designing the array of the patterns for a phase-type diffusing plate, it is easier to make a layout of the patterns of three levels when the area ratio for either one of the levels is larger than the others.

According to the invention, there can exist a solution for very small values of the intensity of white color and the color tint of the 0th order diffracted light when the intermediate level is chosen so as to increase, in this instance, the area ration $S_B$ of the plane portion B to a value between 0.35 and 0.5. This produces such an advantage in manufacturing that the patterns can be arrayed without having to make unduly small the sizes of the patterns and the gaps between the adjacent two of the patterns.

Meanwhile, as the height of the pattern increases, the possibility of occurrence of softening of the contour edges or of formation of bad shapes increases at the time of making an original plate, or, at the time of molding for molded articles. On this account, in the case of the transmitting phase-type diffusing plate, the height of the pattern at the maximum $d_C$ ($\mu$m) is determined so as to satisfy the following condition: where nd is the refractive index for the spectral d-line of the phase portion. As is known by persons of ordinary skill in this field the d-line means the wavelength (587 $\mu$m) of the spectre emitted or absorbed by He.

$$0.7 < (nd-1)d_c/0.587 < 1.2 \quad (4)$$

By this, the intensity and color tint of the 0th order diffracted light of white color are extremely reduced.

In the case of the reflective phase-type diffusing plate, on the other hand, the maximum height $d_C$ ($\mu$m) is determined so as to satisfy the following condition:

$$0.7 < 2d_c/0.587 < 5.1 \quad (5)$$

By this, the intensity and color tint of the 0th order diffracted light of white color are extremely reduced.

When the maximum height $d_C$ is determined within the upper limits of the conditions (4) and (5), an advantage in manufacturing can be enjoyed. When the lower limits are exceeded, the color tint of the 0th order diffracted light increases objectionably.

Here, the size of the phase portion of the 3-level phase-type diffusing plate of the invention is described.

Figure 17:
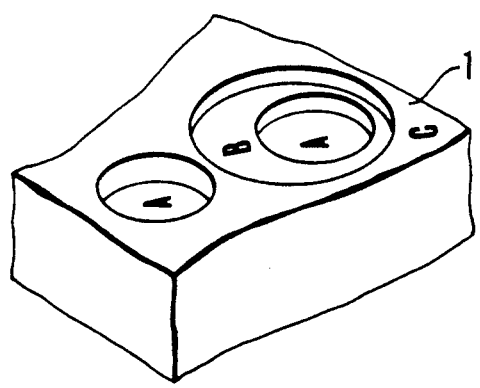
FIG. 17 and FIG. 18 are fragmentary perspective views illustrating different shapes of the phase portions of the 3-level form of the phase-type diffusing plate of the invention.
Figure 18:
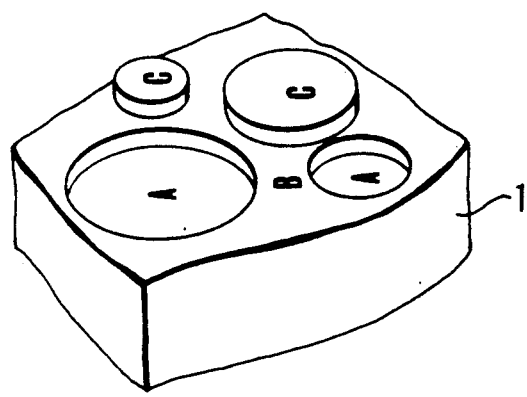

Though, in the example of FIG. 1 and FIG. 9(A) through FIG. 9(D), the plane portions B and C of convex profiles have been arrayed as standing isolated on the reference plane A contiguous to the ground of the substrate over the entire area thereof, it is to be understood that, according to the scope and spirit of the invention, either in another example of FIG. 17, plane portions A and B of concave profiles are arrayed as standing isolated on a reference plane C contiguous to the ground of the substrate over the entire area thereof, or in another example of FIG. 18, plane portions A and C are arrayed as standing isolated on a reference plane B contiguous to the ground of the substrate over the entire area thereof.

In the case of using the phase-type diffusing plate of the invention as, for example, the focusing screen of the camera, it is desirable that if the shape of the isolated plane portion is round, its diameter, or, in the case of asymmetric shapes, the maximum diagonal length, should be chosen to fall in a range of from 2 $\mu$m to 40 $\mu$m, because a good diffusion characteristic is obtained and also because it is easy to manufacture.

In another case of using the phase-type diffusing plate of the invention in so sufficiently far a position (l > 0.3f) from the focal plane of the objective lens like in front of the objective lens, or in the interior of the objective lens, or in the neighborhood of the rear vertex of the objective lens, that it functions as a soft filter, the diameter or diagonal length should be chosen to fall in a range of from 20 $\mu$m to 200 $\mu$m, because a good soft effect is produced.

Incidentally, l is the distance from the focal plane of the objective lens to the filter, and f represents the focal length of the objective lens.

SPECIFIC EXAMPLE 2

Figure 6:
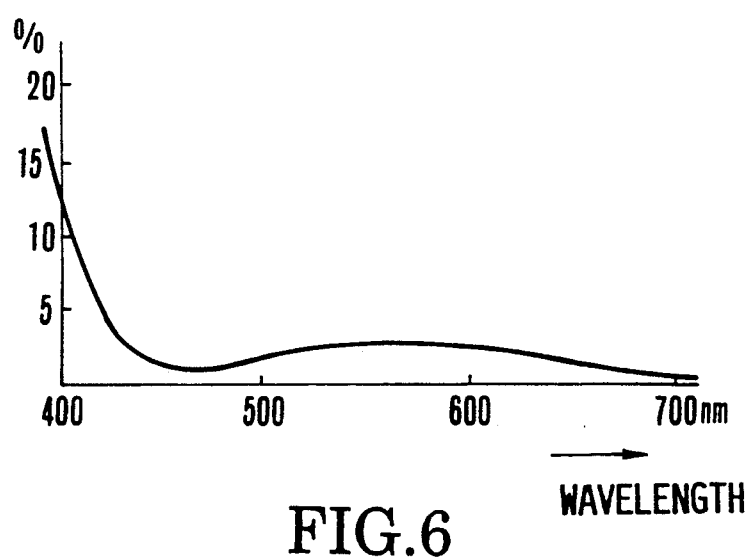
FIG. 6 is a graph of the spectral characteristics of the 0th order diffracted light of a second embodiment of the invention.
Figure 7:
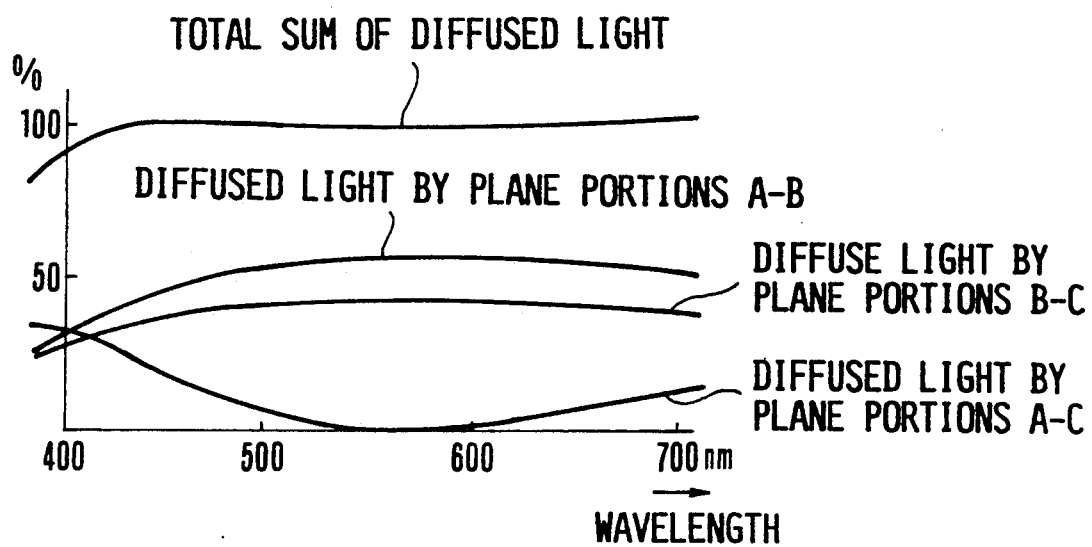
FIG. 7 is a graph of the spectral characteristics of the diffused light of the second embodiment.
Figure 8:
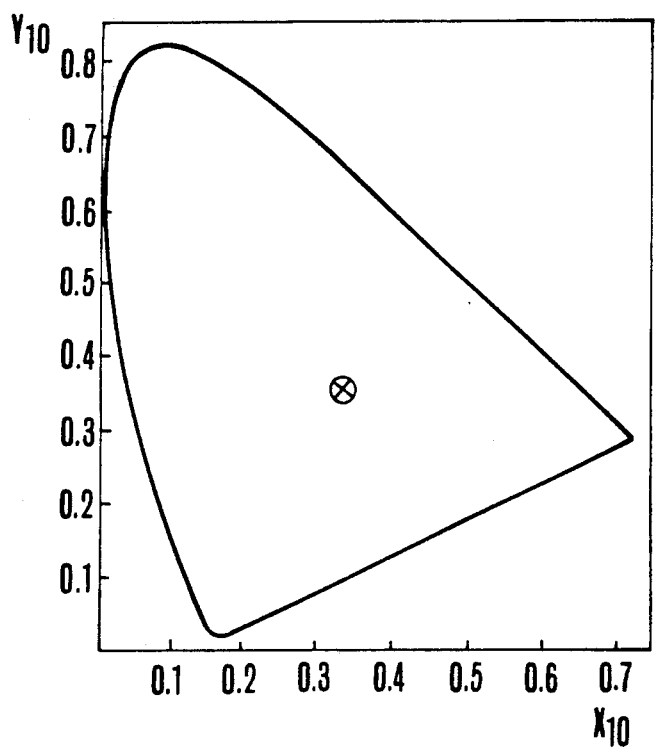
FIG. 8 is a chromaticity diagram of the 0th order diffracted light of the second embodiment.

This example is to employ PMMA in the material of the substrate of the 3-level phase-type diffusing plate. In FIG. 6, there is shown the spectral characteristic of the 0th order diffracted light of this example; in FIG. 7, the spectral characteristic of the diffused light; and in FIG. 8, the chromaticity coordinates of the 0th order diffracted light.

Substrate: PMMA ($nd = 1.49171$, $vd = 57.4$)
Phase Distribution:

Level Differences  $d_B = 0.5863$ $\mu$m, $d_C = 1.1483$ $\mu$m
Area Ratios $S_A = 0.333$, $S_B = 0.417$, $S_C = 0.25$
$(nd - 1) d_B = 0.2883$, $(nd - 1) d_C = 0.5646$
0th Order Diffracted Light:

Intensity (White Color) 2.46%

Chromaticity Coordinates  $x_{10} = 0.336$, $y_{10} = 0.3576$

The following specific examples 3 through 9 employ quartz glass (SiO$_2$) in the material of the substrate and the plane portions (phase portions).

(Specific Example 3)
Phase Distribution:

Level Differences  $d_B = 0.602$ μm, $d_C = 1.205$ μm

Area Ratios $S_A = 0.3$, $S_B = 0.45$, $S_C = 0.25$
0th Order Diffracted Light:
Intensity (White Color) 0.78%

Chromaticity Coordinates  $x_{10} = 0.29$, $y_{10} = 0.279$ (Specific Example 4)
Phase Distribution:

Level Differences  $d_B = 0.628$ μm $d_C = 1.257$ μm

Area Ratios $S_A = 0.3$, $S_B = 0.425$, $S_C = 0.275$
0th Order Diffracted Light:
Intensity (White Color) 1.74%

Chromaticity Coordinates  $x_{10} = 0.344$ $y_{10} = 0.303$ (Specific Example 5)
Phase Distribution:

Level Differences  $d_B = 0.445$ μm, $d_C = 0.969$ μm

Area Ratios $S_A = 0.3$, $S_B = 0.45$, $S_C = 0.25$
0th Order Diffracted Light:
Intensity (White Color) 1.81%

Chromaticity Coordinates  $x_{10} = 0.307$ $y_{10} = 0.286$ (Specific Example 6)
Phase Distribution:

Level Differences  $d_B = 0.498$ μm, $d_C = 1.021$ μm

Area Ratios $S_A = 0.3$, $S_B = 0.45$, $S_C = 0.25$
0th Order Diffracted Light:
Intensity (White Color) 0.62%

Chromaticity Coordinates  $x_{10} = 0.276$, $y_{10} = 0.3$ (Specific Example 7)
Phase Distribution:

Level Differences $d_B = 0.55$ μm, $d_C = 1.1$ μm
Area Ratios $S_A = 0.4$, $S_B = 0.425$, $S_C = 0.175$
0th Order Diffracted Light:
Intensity (White Color) 2.02%

Chromaticity Coordinates  $x_{10} = 0.307$ $y_{10} = 0.338$ (Specific Example 8)
Phase Distribution:

Level Differences  $d_B = 0.471$ μm, $d_C = 0.943$ μm

Area Ratios $S_A = 0.37$, $S_B = 0.43$, $S_C = 0.2$
0th Order Diffracted Light:
Intensity (White Color) 1.61%

Chromaticity Coordinates  $x_{10} = 0.359$ $y_{10} = 0.29$ (Specific Example 9)
Phase Distribution:

Level Differences $d_B = 0.549$ μm, $d_C = 1.1$ μm
Area Ratios $S_A = 0.3$, $S_B = 0.4$, $S_C = 0.3$
0th Order Diffracted Light:

-continued

Intensity (White Color) 2.8%

Chromaticity Coordinates  $x_{10} = 0.264$, $y_{10} = 0.409$

As far as the invention is concerned, the above-described conditions are applicable not only to the transmission type of the 3-level phase-type diffusing plate but also to the reflection type of the phase-type diffusion plate. In the latter case, the light wave is assumed to enter from , and reflect to, from above the diffusing plate.

Though, in the foregoing description of the invention, the area ration is defined as the area ratio to the entirety, the entirety does not always mean the whole body of the diffusing plate. It may be dealt with as the dimension (about 0.5 to 5 mmφ) of the light bundle to be used.

Also, in the case of the plane portions (phase portions) having their contour edges softened, the size measured at the middle of the height of the phase portion is employed.

The shape of the phase portion of the 3-level phase-type diffusing plate is not limited to that shown in FIG. 1, but may be considered to be like the shapes of FIG. 17 and FIG. 18. The use of such shapes makes it easier to array the patterns. Again, if the plain field of the plane portion A abruptly encounters the steep wall of the phase portion C of the maximum height $d_C$ like that of FIG. 1, the softening of the contour edges will be intensified in manufacturing. If the shape is altered such as shown in FIG. 17 and FIG. 18, the possibility of occurrence of appreciable softening can be minimized. Incidentally, relevant embodiments to this will be described in detail later.

Other examples of the array of patterns are mentioned below.

Figure 9A:
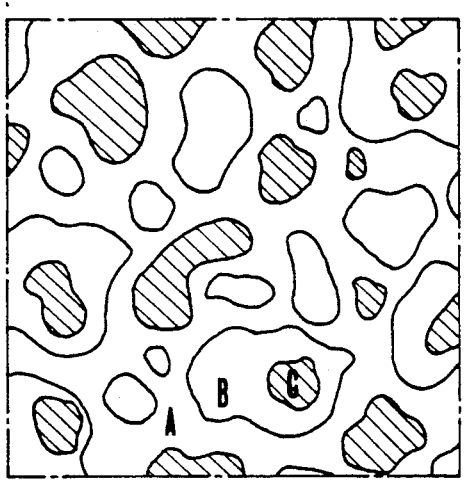
FIG. 9(A) to FIG. 9(D) are schematic top views of practical examples of the patterns of the 3-level phase-type diffusing plate of the invention.

The phase portions of the 3-level phase-type diffusing plate of FIG. 9(A) are of indeterminate shape so that the diffracted light is prevented from being localized, and smooth blurring is realized. Here, the reference plane is the plane portion A. The regions enclosed by the solid lines correspond to the plane portion B, the hatched ones to the plane portion C.

Figure 9B:
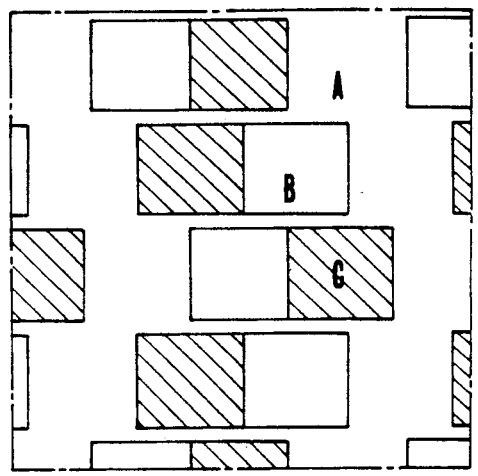

FIG. 9(B) shows a square shape of the plane portions B and C distributed at random on the plane portion A that is the reference plane of the 3-level phase-type diffusing plate.

Figure 9C:
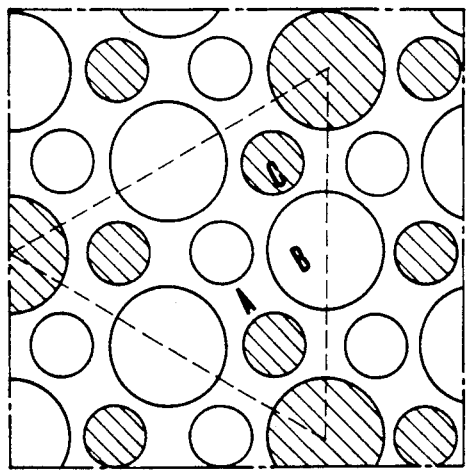

FIG. 9(C) shows two round shapes of different size of each of the plane portions B and C distributed at random on the plane portion A that is the reference plane of the 3-level phase-type diffusing plate, whereby a regular triangle shown by dashed lines is taken as a unit of structure when it is arrayed periodically.

Figure 9D:
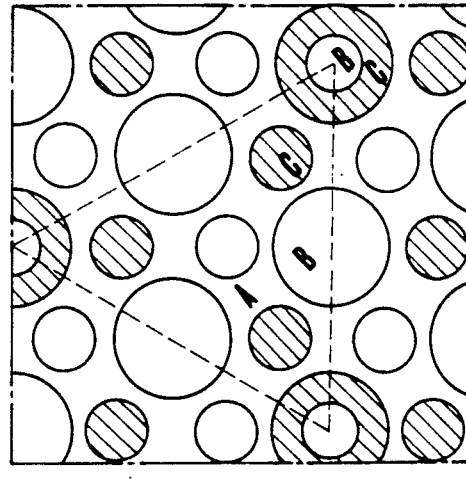
Figure 10:
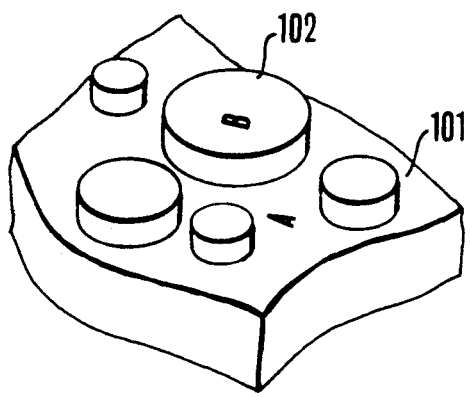
FIG. 10 is a fragmentary perspective view of the conventional bi-level phase-type diffusing plate.
Figure 11:
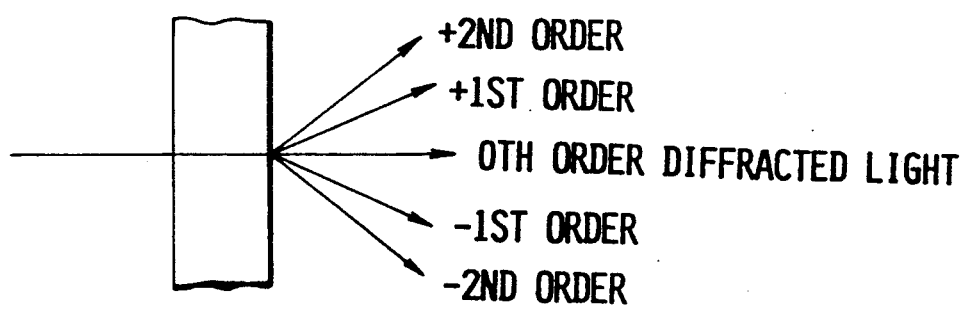
FIG. 11 is a diagram to explain the angles of diffraction.

FIG. 9(D) shows two round shapes of the plane portion B and a round and doughnut shape of the plane portion C distributed at random on the plane portion A that is the reference plane of the 3-level phase-type diffusing plate, whereby a regular triangle shown by dashed lines is taken as a unit of structure, when it is arrayed periodically.

By the way, for form's sake, another embodiment should be described with reference to FIG. 18 and FIG. 19 in which a plurality of minute plane portions including a reference plane, and made to have three kinds of heights as a whole are provided on a substrate so that predetermined phase differences are given to the entering light by utilizing the plane portions so that the light is diffracted and/or scattered so as to obtain a desired diffusion characteristic, wherein the plane portions are labeled with A, B and C in the order from the lowest height as they turn upward, and the plane portion B is made contiguous to the reference plane (equal to the ground), whereby the plane portion A is constructed with a plurality of independent patterns of concave profile relative to the plane portion B, and the plane portion C is constructed with a plurality of independent patterns of convex profile relative to the plane portion B.

Figure 19:
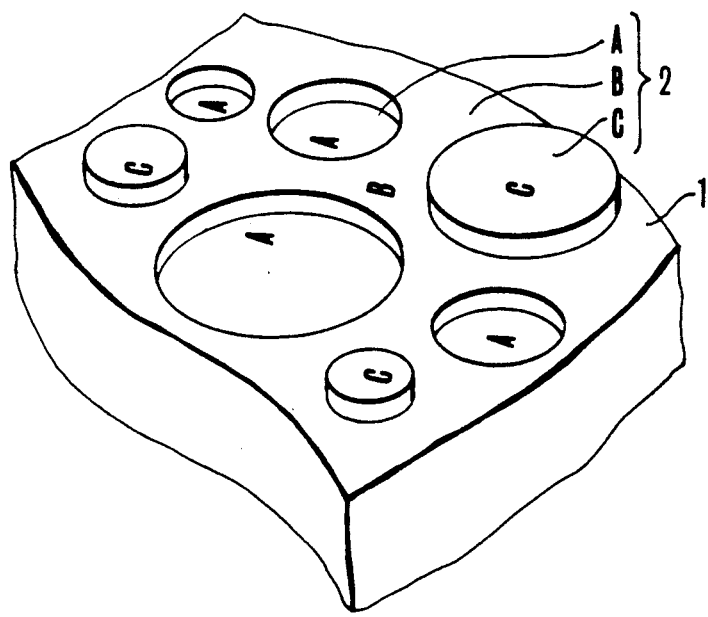
FIG. 19 is a perspective view of the main parts of another embodiment of the invention.

FIG. 19 is a fragmentary perspective view of another embodiment relevant to the invention.

In the figure, reference numeral 1 denotes a substrate made of optically transparent material. Of plane portions A, B and C, the plane portion B corresponds to the patterns contiguous to the ground of the substrate 1, being different in height from the other plane portions A and C.

With the plane portion B taken as the reference plane, the plane portion A consists of a plurality of independent patterns of concave profile relative to the plane portion B, and the plane portion C consists of a plurality of independent patterns of convex profile relative to the plane portion B. These three plane portions A, B and C give different phase differences from one another to the entering light.

Thus, a phase-type diffusing plate of the so-called 3-level form is constructed. In the same figure, the plane portion B is taken as the reference, and, in the order from the lowest height, the plane portion A, the plane portion B and the plane portion C are arranged. The material of which the concave and convex patterns forming the plane portions A and C are made is the same as that of the substrate 1. It is to be noted that in view of the refractive index of the material of the plane portion A as the reference, the plane portions B and C may be made of a material of different refractive index from that of the material of the plane portion A. The shapes of the patterns A and C, though shown as round, may be ellipse, elongated round, polygon, or any other ones.

Specific examples of this embodiment of the invention are shown below.

Figure 20:
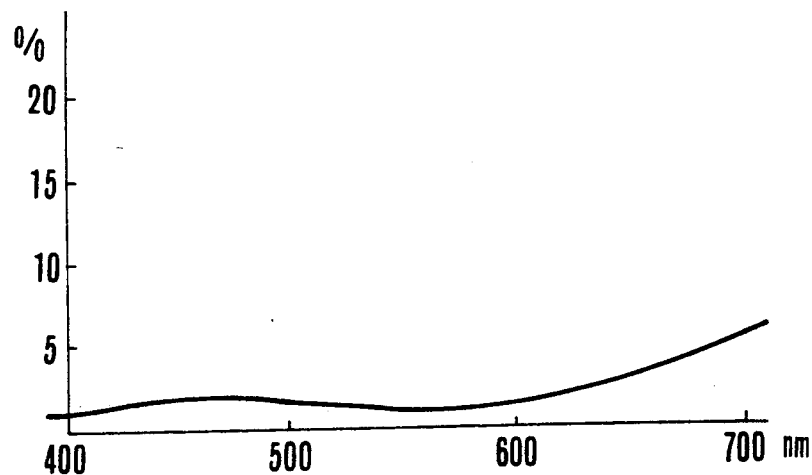
FIG. 20 is a graph of the spectral characteristic of the 0th order diffracted light of the FIG. 19 embodiment of the invention.

(Specific Example 10)
Substrate: Quartz Glass
($SiO_2$: $nd = 1.4586$, $vd = 67.9$)
Phase Distribution:
Level Differences $d_B = 0.498$ μm, $d_C = 0.995$ μm
Area Ratios $S_A = 0.37$, $S_B = 0.43$, $S_C = 0.2$ This diffusing plate was tested to evaluate the intensity of the 0th order diffracted light with the weight of the relative luminous efficiency, and it has been found to have a value of as small as 1.38%. And the 0th order diffracted light shows a spectral characteristic shown in FIG. 20, which is considerably flat.

Figure 21:
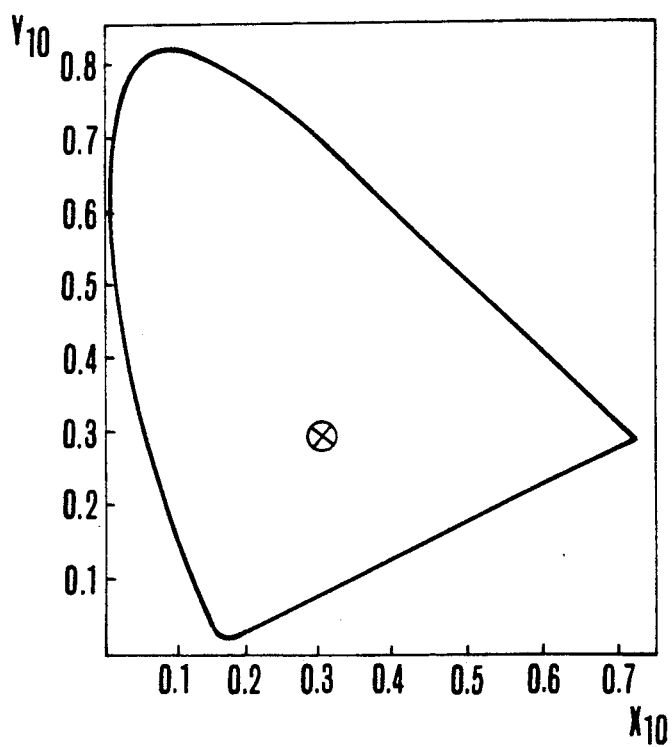
FIG. 21 is a chromaticity diagram of the 0th diffracted light of the FIG. 19 embodiment of the invention.

Its color is, as shown in the chromaticity diagram of FIG. 21, almost white since it lies at a point of $x_{10} = 0.3059$, $y_{10} = 0.2929$. Therefore, when used in combination with, for example, the telephoto end, no luminance unevenness and color unevenness is produced at small apertures. Also when with the standard lens, almost no color tint appears at small apertures.

The manufacturing process for the plane portions of the shapes of the present invention may comprise a first step of digging the surface of the substrate to a corresponding depth to the difference between the heights of the plane portion B and the plane portion C, or $d_C - d_B$, by dry etching or like technique, leaving the plane portion C, a second step of digging the plane portion A to a depth $d_B$ by dry etching or like technique. Thus, the diffusing plate can relatively easily be manufactured.

Again, the configuration of the plane portions of the present embodiment is so determined that among the area ratios of the plane portion A, and the plane portion B and the plane portion C, or $S_A$ and $S_B$ and $S_C$, the area ratio $S_B$ of the plane portion B of the intermediate height is made largest to increase the degree of freedom of the pattern layout. Thus, a further improved diffusion characteristic is obtained.

SPECIFIC EXAMPLE 11

This example is to employ PMMA in the substrate. The numerical data for the similar factors to those of the specific example 10 are shown below.

Substrate: PMMA ($nd = 1.49171$, $vd = 57.4$)
Phase Distribution:
Level Differences $d_B = 0.5375$ μm,
$d_C = 1.1238$ μm
Area Ratios $S_A = 0.3$, $S_B = 0.45$, $S_C = 0.25$
0th Order Diffracted Light:
Intensity (White Color) 1.21%
Chromaticity Coordinates $x_{10} = 0.333$
$y_{10} = 0.391$ The phase-type diffusing plate of the invention is not only confined to the transmission type, but also can be used as the reflection type of the phase-type diffusing plate without any alteration except that the plane portions (phase portions) A, B and C are used as the reflection plane. For this case, the light bundle enters from, and reflects to, the above of the phase-type diffusing plate.

In the present invention, the area ratio of each plane portion is defined as the area ratio to the entirety. The term "entirety" herein used does not always mean the entire body of the diffusing plate, and may be dealt with as the dimension (about 0.5 to 5 mmφ) of the light beam to be used.

Also, with the plane portions having their contour edges softened, the size may be measured at a middle height of the plane portion (phase portion).

Figure 22A:
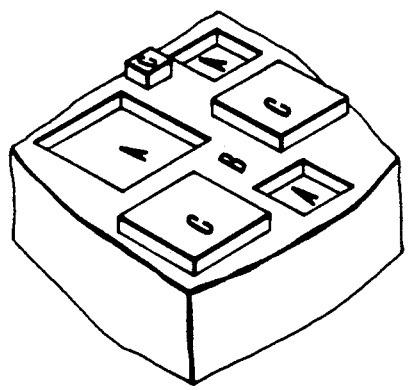
FIG. 22(A) and FIG. 22(B) are perspective views of the main parts of other embodiments of the invention.
Figure 22B:
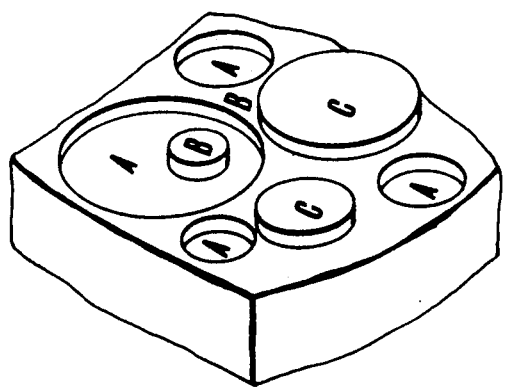

As the shapes of the plane portions (phase portions) of the 3-level phase-type diffusing plate, besides those shown in FIG. 19, use may be made of those shown in FIG. 22(A) where the plane portions A and C are rectangular shapes, or those shown in FIG. 22(B) where the plane portion A which is lower than the plane portion B are round shapes, and that part of the plane portion B which lies on the plane portion A is round shaped with an equal height to that of the other part of the plane portion B.

According to the invention, by providing a diffusing plate with three kinds of plane portions of different heights comprising a plurality of minute patterns of predetermined shapes on the upper surface of a substrate, when used as, for example, the focusing screen of the photographic camera, a focusing screen having the following advantages can be obtained.

(a) Since the 0th order diffracted light is little tinted with color, there is no possibility of the entire area of the field of view of the finder being tinted with the same color as that of the 0th order diffracted light, even when the standard lens is used at small apertures. Thus, a natural color gamut of a good finder image can be obtained.

(b) Since the 0th order diffracted light is little tinted with color, for small apertures of a lens system whose pupil is out of coincidence, such as the telephoto lens, the color unevenness can be minimized.

(c) Because the intensity of the 0th order diffracted light of white color can be weakened, for the telephoto lens, the luminance unevenness resulting from the stopping down of the diaphragm to small apertures can be minimized.

(d) Because the intensity of the 0th order diffracted light of white color can be weakened, for the telephoto lens, the luminance unevenness (telephoto spot) at full open aperture can be minimized.

(e) As the small color tint of the 0th order diffracted light is reflected is a small color tint of the diffused light, for the telephoto lens, the color unevenness at full open aperture can be corrected to a smaller value than that with the conventional bi-level CAD mat.

(f) Since the intermediate plane portion is made contiguous to the ground, it is possible to reduce the possibility of the contour edges being softened when the original plate is made, or when molding is carried out, to prevent the performance from being lowered in manufacturing, and to increase the degree of freedom of the layout of patterns of the plane portions.

What is claimed is:

1. A phase-type diffusing plate comprising:
three plane portions of different heights in small areas, wherein the plane portion A, the plane portion B and the plane portion C are arranged in the order from the lowest height, and letting the height of said plane portion B relative to said plane portion A be denoted by $d_B$, the height of said plane portion C relative to said plane portion A by $d_C$, and the area ratios of said plane portions A, B and C by $S_A$, $S_B$ and $S_C$ to the entire area (where $S_A+S_B+S_C=1$) respectively, the following conditions are satisfied:

$1.6 < d_C/d_B < 2.5$ $0.35 < S_B < 0.5$

2. A phase-type diffusing plate according to claim 1, satisfying the following condition:

$0.46 < S_A/S_C < 0.95$ $0.35 < S_B < 0.5.$

3. A phase-type diffusing plate according to claim 1 or 2, wherein said phase-type diffusing plate comprises a transmission type diffusing plate, and satisfies the following conditions:

$0.7 < (nd-1)d_c/0.587 < 1.2$ where $d_c$ is the height (in $\mu$m) of said plane portion C and nd is the refractive index for the spectral d-line (wavelength: 0.587 $\mu$m) of the phase portion.

4. A phase-type diffusing plate according to claim 1 or 2, wherein said phase-type diffusing plate comprises a reflection type diffusing plate, and satisfies the following condition:

$0.7 < 2d_c/0.587 < 5.1$ where $d_c$ is the height (in $\mu$m) of said plane portion C.

5. A camera comprising:
a photographic lens; and
a focusing screen arranged at or near a plane on which said photographic lens forms an image,
said focusing screen having three minute plane portions of different heights, the plane portion A, the plane portion B, and the plane portion C being arranged in the order from the lowest height, and, letting the height of said plane portion B relative to said plane portion A be denoted by $d_B$, the height of said plane portion C relative to said plane portion A by $d_C$, and the area ratios of said plane portions A, B and C to the entire area by $S_A$, $S_B$ and $S_C$ (where $S_A+S_B+S_C=1$) respectively, the following conditions are satisfied:

$1.6 < d_C/d_B < 2.5$ $0.35 < B_S < 0.5.$

6. A camera according to claim 5, wherein said focusing screen satisfies the following condition:

$0.46 < S_A/S_C < 0.95$ $1.05 < S_A/S_C < 2.2.$

7. A camera according to claim 5, wherein said focusing screen comprises a transmission type phase-type diffusing plate, and satisfies the following condition:

$0.7 < (nd-1)d_c/0.587 < 1.2$ where $d_c$ is the height (in $\mu$m) of said plane portion C and nd is the refractive index for the spectral d-line (wavelength: 0.587 $\mu$m) of the phase portion.

8. A camera according to claim 5, wherein said focusing screen comprises a reflection type phase-type diffusing plate, and satisfies the following condition:

$0.7 < 2d_c/0.587 \leq 5.1$ where $d_c$ is the height (in $\mu$m) of said plane portion C.

9. A phase-type diffusing plate according to claim 1, wherein said plane portion A is of concave profile relative to said plane portion B, and wherein said plane portion C is of convex profile relative to said plane portion B.

10. A camera according to claim 5, wherein said plane portion A is of concave profile relative to said plane portion B, and said plane portion C is of convex profile relative to said plane portion B.

11. A phase-type diffusion plate according to claim 1, wherein at least one of said plane portions is of a circular shape.

12. A camera according to claim 5, wherein at least one of said plane portions is of a circular shape.

13. A phase-type diffusion plate according to claim 1, wherein said plane portions are arranged two-dimensionally.

14. A phase-type diffusion plate according to claim 13, wherein said plane portions are arranged in an island-like fashion.

15. A camera according to claim 5, wherein said plane portions are arranged two-dimensionally.

16. A camera according to claim 15, wherein said plane portions are arranged in an island-like fashion.

* * * * *

UNITED STATES PATENT AND TRADEMARK OFFICE
CERTIFICATE OF CORRECTION

PATENT NO. : 5,089,835

DATED : February 18, 1992

INVENTOR(S) : NOZOMU KITAGISHI

It is certified that error appears in the above-identified patent and that said Letters Patent is hereby corrected as shown below:

COLUMN 1:
    Line 61, "$\phi(x,y)_B = 2\phi(n-1) \cdot d_B/\lambda$" should read --$\phi(x,y)_B = 2\pi(n-1) \cdot d_B/\lambda$--.

COLUMN 2:
    Line 1, "$I_0 = 1-2S_A \cdot S_B \cdot (1-(\cos(2\phi(n-1) \cdot d_B/\lambda)$" should read --$I_0 = 1-2S_A \cdot S_B \cdot (1-(\cos(2\pi(n-1) \cdot d_B/\lambda)$--; and
    Line 25, "problem,." should read --problem,--.

COLUMN 3:
    Line 5, "the" should read --the present--;
    Line 6, "ratio," should read --ratios,--;
    Line 11, "and," should read --and, further,--; and "further" should be deleted;
    Line 14, "system, should read --system--;
    Line 15, "camera" should read --camera--; and
    Line 60, "practical" should read --other practical--.

COLUMN 4:
    Line 15, "characteristic" should read --characteristics--; and
    Line 47, "structure" should read --structure,--.

COLUMN 6:
    Line 4, "make" should read --making--; and
    Line 27, "and" should read --and it--.

COLUMN 7:
    Line 1, "Othe" should read --Oth--;
    Line 15, "C," should read --C--;
    Line 38, "ration" should read --ratio--;
    Line 51, "condition:" should read --condition: $0.7<(nd-1)d_C/0.587<1.2$ (4)--; and
    Line 57, "$0.7<(nd-1)d_C/0.587<1.2$ (4)" should be deleted.

UNITED STATES PATENT AND TRADEMARK OFFICE
CERTIFICATE OF CORRECTION

PATENT NO.  : 5,089,835
DATED       : February 18, 1992
INVENTOR(S) : NOZOMU KITAGISHI Page 2 of 2

It is certified that error appears in the above-identified patent and that said Letters Patent is hereby corrected as shown below:

COLUMN 10:
    Line 12, "from ," (1st occurrence) should read --from,--;
        and "from" (2nd occurrence) should be deleted;
    Line 15, " ration" should read --ratio--;
    Line 28, "plain" should read --plane--; and
    Line 50, "size" should read --sizes--.

COLUMN 11:
    Line 64, "Also when" should read --Also, when used--.

COLUMN 12:
    Line 39, "the above of" should read --above the--; and
    Line 56, "are round shapes," should read --is round shaped,--.

COLUMN 13:
    Line 19, "is" (2nd occurrence) should read --in--.

Signed and Sealed this

Sixth Day of July, 1993

MICHAEL K. KIRK

Attest:

Attesting Officer

Acting Commissioner of Patents and Trademarks